(12) United States Patent
Kimura et al.

(10) Patent No.: US 6,511,400 B2
(45) Date of Patent: Jan. 28, 2003

(54) CONTROL SYSTEM FOR VEHICULAR AUTOMATIC TRANSMISSION

(75) Inventors: Hiroyuki Kimura, Wako (JP); Yasuhiro Ijichi, Wako (JP); Yuuji Okazaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/941,983

(22) Filed: Aug. 30, 2001

(65) Prior Publication Data

US 2002/0025883 A1 Feb. 28, 2002

(30) Foreign Application Priority Data

Aug. 31, 2000 (JP) ........................................ 2000-262781

(51) Int. Cl.$^7$ .............................................. F16H 61/00
(52) U.S. Cl. ..................... 477/117; 477/143; 477/127; 477/158
(58) Field of Search ................................ 477/117, 143, 477/127, 131, 138, 158, 160

(56) References Cited

U.S. PATENT DOCUMENTS

| | | | | |
|---|---|---|---|---|
| 5,449,329 A | * | 9/1995 | Brandon et al. | 477/143 |
| 5,879,268 A | * | 3/1999 | Yasue et al. | 477/143 |
| 6,149,547 A | * | 11/2000 | Oba et al. | 477/143 |
| 6,287,238 B1 | * | 9/2001 | Park | 477/143 |
| 6,368,249 B1 | * | 4/2002 | Hubbard | 477/121 |

FOREIGN PATENT DOCUMENTS

| | | |
|---|---|---|
| JP | 11-108169 | 4/1999 |
| JP | 11-201270 | 7/1999 |

* cited by examiner

*Primary Examiner*—Sherry Estremsky
*Assistant Examiner*—Tisha D. Lewis
(74) *Attorney, Agent, or Firm*—Armstrong, Westerman & Hattori, LLP

(57) ABSTRACT

A control system for executing an upshift from an off-going speed ratio to an on-coming speed ratio by controlling the release of the hydraulic pressure from the frictionally engaging element used for the off-going speed ratio and by controlling the supply of the hydraulic pressure to the frictionally engaging element used for the on-coming speed ratio comprises first and second off-going pressure releasing valves 70 and 80, which release the hydraulic pressure of the frictionally engaging element used for the off-going speed ratio, and a linear solenoid valve 60, which controls the operation of the off-going pressure releasing valves. The linear solenoid valve 60 controls the operation of the off-going pressure releasing valves in correspondence to the throttle opening of the engine. In this case, the smaller the throttle opening of the engine, the earlier the timing for releasing the hydraulic pressure from the frictionally engaging element used for the off-going speed ratio is set.

8 Claims, 5 Drawing Sheets

CONTROL SYSTEM FOR VEHICULAR AUTOMATIC TRANSMISSION

FIELD OF THE INVENTION

The present invention relates generally to an automatic transmission, which is disposed for a speed ratio change in the power transmission path between the engine and the drive wheels of a vehicle. Furthermore, the present invention relates particularly to a control system that controls the automatic transmission for a shift from an off-going speed ratio to an on-coming speed ratio.

BACKGROUND OF THE INVENTION

Automatic transmissions have been used in vehicles. Generally, an automatic transmission for use in a vehicle comprises a plurality of gear trains, which are disposed parallel with one another, a plurality of frictionally engaging elements such as friction clutches, which are used for selecting a certain gear train for power transmission from these gear trains, and a shift control valve, which controls the actuation of the frictionally engaging elements. For such an automatic transmission, for example, Japanese Laid-Open Patent Publication Nos. 11(1999)-108169 and 11(1999)-201270 disclose a shift control system.

In the shift control performed by the control system, the shift control valve functions to release a clutch which has been in engagement (hereinafter referred to as "off-going clutch" or "off-going frictionally engaging element"), and to bring another clutch into engagement (hereinafter referred to as "on-coming clutch" or "oncoming frictionally engaging element") for shifting the gear trains of the transmission, from the off-going speed ratio to the on-coming speed ratio. If the release of the off-going clutch and the engaging actuation of the on-coming clutch are not controlled appropriately, then a shift shock, an engine racing, etc. may happen, damaging the smooth shifting of the gear trains. To avoid such discomforts, these clutches must be controlled in a timely manner. Therefore, a prior-art control system has incorporated, for example, a release-timing control valve which controls the timing for releasing the off-going clutch in synchronization to the increase of the hydraulic pressure used for the actuation of the on-coming clutch (this valve is also referred to as "orifice control valve" by the applicant of the present invention).

However, this release-timing control valve is designed simply to function in response to a change in the hydraulic pressure which actuates the on-coming clutch. In this control system, the release-timing control valve opens to release the hydraulic pressure of the off-going clutch for disengaging this clutch when the hydraulic pressure actuating the on-coming clutch has increased to a certain level. Because of this limited performance of the release-timing control valve, it is difficult for the control system to respond effectively to all the shifts that are requested and executed in the different conditions of the transmission, for example, to a power-on shift, i.e., a shift executed while the accelerator pedal is pressed down, or to a power-off shift, i.e., a shift executed while the accelerator pedal is released. Depending on the condition where a shift is executed, a shift shock can occur.

For example, whether the shift being executed is a power-on upshift or a power-off upshift, as long as the shift is executed from the same speed ratio, the release-timing control valve functions in an identical way to reduce the hydraulic pressure of the off-going clutch when the hydraulic pressure of the on-coming clutch for engagement has increased to a predetermined value. In this case, the release-timing control valve is designed to make the power-on shifts smooth and not to cause an engine racing. However, for a power-off shift, there is a delay in the response of the release-timing control valve to release the off-going clutch, and this may cause a shift shock.

SUMMARY OF THE INVENTION

It is an object of the present invention to provide a control system for a vehicular automatic transmission, which system always performs a smooth shift operation by controlling appropriately the timing for releasing the off-going frictionally engaging element in correspondence, for example, to the accelerator opening (engine throttle opening).

In order to achieve this objective, the present invention provides, for an automatic transmission, which can be used in a vehicle, a control system that comprises a plurality of frictionally engaging elements (for example, the FIRST~FOURTH speed clutches 31~34 described in the following embodiment), which are actuated for engagement upon receiving a hydraulic pressure to establish selectively a plurality of speed ratios. In this control system, an upshift from an off-going speed ratio to an on-coming speed ratio is executed by controlling the release of the hydraulic pressure from the frictionally engaging element used for the off-going speed ratio and by controlling the supply of the hydraulic pressure to the frictionally engaging element used for the on-coming speed ratio. The control system further comprises an off-going pressure releasing valve (for example, the first and second off-going pressure releasing valves 70 and 80 described in the following embodiment), which releases the hydraulic pressure of the frictionally engaging element used for the off-going speed ratio, and release timing adjustment means (for example, the linear solenoid valve 60 described in the following embodiment), which controls the operation of the off-going pressure releasing valve. The release timing adjustment means controls the operation of the off-going pressure releasing valve in correspondence to the throttle opening of the engine. In this case, the smaller the throttle opening of the engine, the earlier the timing for releasing the hydraulic pressure from the frictionally engaging element used for the off-going speed ratio is set.

While an upshift is being executed, if the frictionally engaging element used for the off-going speed ratio is released before the frictionally engaging element used for the on-coming speed ratio engages sufficiently, then an engine racing may happen, damaging the smoothness of the shift operation. This problem is likely to be manifested in a power-on shift. On the other hand, if the release of the frictionally engaging element used for the off-going speed ratio is delayed, then the condition of the transmission will be such that both the frictionally engaging elements for the off-going speed ratio and the on-coming speed ratio are in engagement. This condition results in a shift shock, damaging the smoothness of the shift operation. This problem is likely to be manifested in a power-off shift, in which the torque being transmitted becomes small. To clear such likely problems, the control system according to the present invention adjusts, by the release timing adjustment means, the timing for releasing the hydraulic pressure from the frictionally engaging element used for the off-going speed ratio earlier for a smaller throttle opening of the engine (i.e., the closer to a power-off condition, the earlier the timing). In this way, the control system sets the timing for releasing the frictionally engaging element used for the off-going speed ratio appropriately for either a power-on shift or a power-off shift and always achieves a smooth shift operation.

Also, it is preferable that the release timing adjustment means control the operation of the off-going pressure releasing valve in correspondence to the speed of the vehicle. In this case, the lower the speed of the vehicle, the earlier the timing for releasing the hydraulic pressure from the frictionally engaging element used for the off-going speed ratio is set. While the throttle opening of the engine is kept constant, the lower the speed of the vehicle, more likely a shift shock to occur if the timing for releasing the frictionally engaging element used for the off-going speed ratio is delayed. The release timing control according to the present invention, however, provides an improved smooth shift operation for any speed of the vehicle because the control is executed in correspondence to the speed of the vehicle.

Sometimes, an automatic transmission for use in a vehicle comprises a torque converter with a lock-up mechanism, the torque converter being connected to the output shaft of the engine. In this case, the release timing adjustment means comprises a linear solenoid valve, and a control pressure supplied from the linear solenoid valve is used for controlling the operation of the pressure releasing valve, and also, while no shift is being performed, it is used for controlling the operation of the lock-up mechanism. In this way, the linear solenoid valve provided as the release timing adjustment means can also be used for controlling the operation of the lock-up mechanism while the vehicle is in ordinary travelling condition (i.e., while no shift is being executed). As a result, the control system can be constructed in a simple design.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 2:
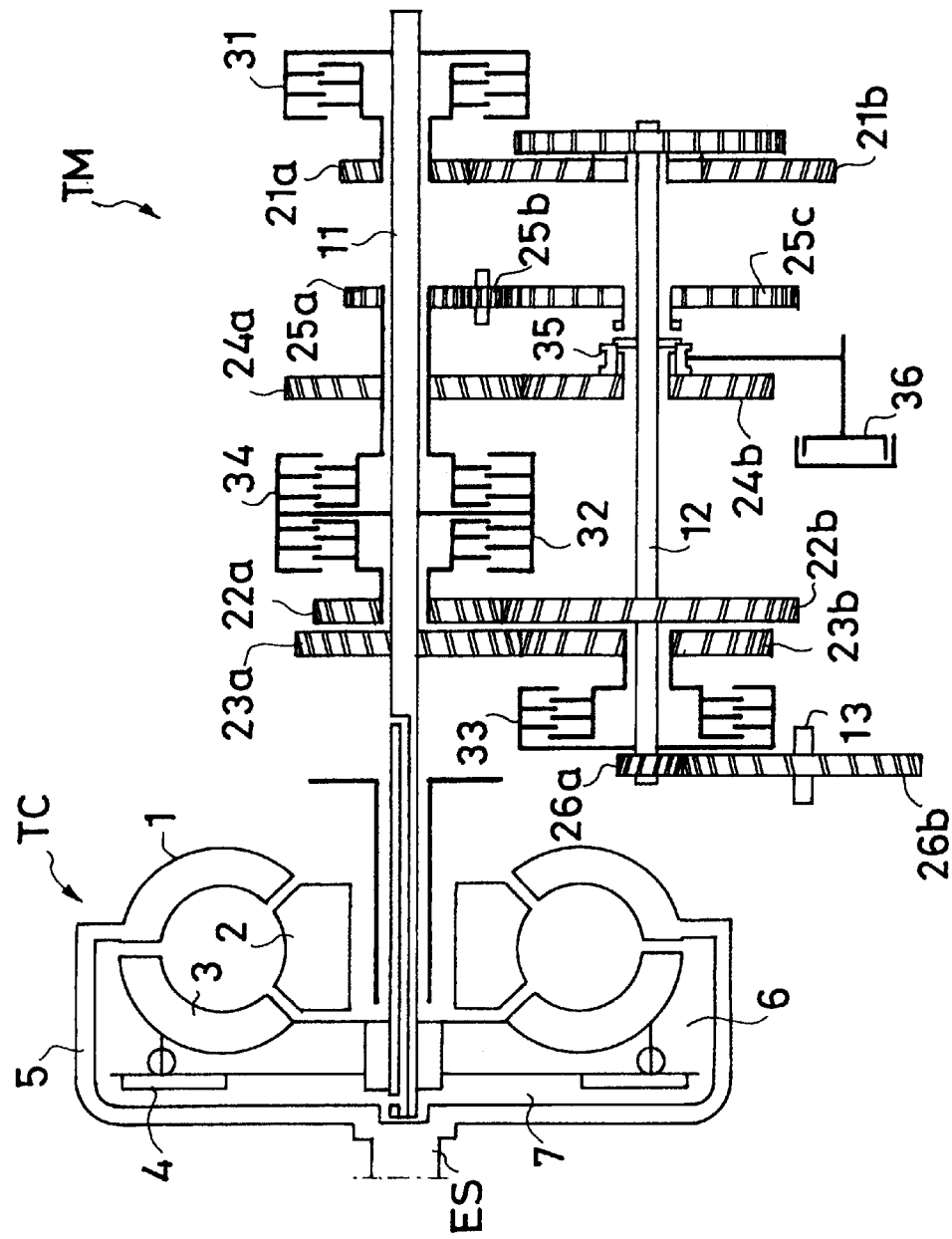
FIG. 2 is a schematic diagram of an automatic transmission, which incorporates the control system.

Now, a preferred embodiment according to the present invention is described in reference to the drawings. At first, an automatic transmission for use in a vehicle is described in reference to FIG. 2 as an example of transmission which incorporates a preferred embodiment of control system according to the present invention. This automatic transmission TM comprises a torque converter TC, which is connected to the output shaft ES of the engine. Furthermore, the torque converter TC comprises a pump element 1, which is connected through a converter housing 5 to the engine output shaft ES, a stator element 2, which is held stationary by a one-way clutch, and a turbine element 3, which is connected to the input shaft 11 of the transmission.

In the converter housing 5, provided is a lock-up clutch 4, which is connected to the turbine element 3. The lock-up clutch 4 divides the internal space of the converter housing 5 into a lock-up engagement space 6 and a lock-up release space 7, and the hydraulic pressures of the lock-up engagement space 6 and the lock-up release space 7 are controlled to actuate the lock-up clutch 4 for engagement and disengagement. When the hydraulic pressure of the lock-up engagement space 6 becomes higher than that of the lock-up release space 7, the lock-up clutch 4 engages to connect the converter housing 5 directly to the turbine element 3, and, as a result, the power of the engine is transmitted directly from the output shaft ES of the engine to the input shaft 11 of the transmission. On the other hand, when the hydraulic pressure of the lock-up engagement space 6 becomes lower than that of the lock-up release space 7, the lock-up clutch 4 is released, and, as a result, the power of the engine is transmitted from the output shaft ES through the torque converter TC to the input shaft 11 of the transmission.

In addition to the input shaft 11, the automatic transmission TM includes a countershaft 12 and an output shaft 13, both of which are disposed parallel with the input shaft 11, and a plurality of gear trains are disposed between the input shaft 11 and the countershaft 12.

On the input shaft 11 of the transmission, from the left side of the drawing, disposed are a THIRD speed drive gear 23a, a SECOND speed drive gear 22a, a FOURTH speed drive gear 24a, a REVERSE drive gear 25a, and a FIRST speed drive gear 21a. The THIRD speed drive gear 23a is fixed on the input shaft 11 while the SECOND speed drive gear 22a, the FOURTH speed drive gear 24a, the REVERSE drive gear 25a and the FIRST speed drive gear 21a are rotatable with respect to the input shaft 11. Furthermore, the input shaft 11 is equipped with a SECOND speed clutch 32, which engages and disengages the SECOND speed drive gear 22a to and from the input shaft 11, a FOURTH speed clutch 34, which engages and disengages the FOURTH speed drive gear 24a and the REVERSE drive gear 25a to and from the input shaft 11, and a FIRST speed clutch 31, which engages and disengages the FIRST speed drive gear 21a to and from the input shaft 11.

On the countershaft 12 of the transmission, from the left side of the drawing, disposed are an output drive gear 26a, a THIRD speed driven gear 23b, a SECOND speed driven gear 22b, a FOURTH speed driven gear 24b, a REVERSE driven gear 25c, and a FIRST speed driven gear 21b, and these driven gears mesh directly with the THIRD speed drive gear 23a, the SECOND speed drive gear 22a, the FOURTH speed drive gear 24a, the REVERSE drive gear 25a and the FIRST speed drive gear 21a, respectively, with an exception that the REVERSE driven gear 25c meshes with the REVERSE drive gear 25a through a REVERSE idle gear 25b. The output drive gear 26a and the SECOND speed driven gear 22b are fixed directly on the countershaft 12 while the FIRST speed driven gear 21b is mounted through a one-way clutch on the countershaft 12, and the THIRD speed driven gear 23b, the FOURTH speed driven gear 24b and the REVERSE driven gear 25c are provided rotatably around the countershaft 12.

Furthermore, the countershaft 12 is equipped with a THIRD speed clutch 33, which engages and disengages the THIRD speed driven gear 23b to and from the countershaft 12, and a REVERSE selector 35, which engages and disengages selectively the FOURTH speed driven gear 24b and the REVERSE driven gear 25c to and from the countershaft 12. The REVERSE selector 35 is actuated by a selector servo-mechanism 36.

The output shaft 13 of the transmission is equipped with an output driven gear 26b, which meshes with the output drive gear 26a. The power output from the transmission is transmitted, for example, through a differential mechanism to the right and left front wheels of the vehicle.

In this automatic transmission TM, the shift control is performed to select a desired gear train for the power transmission by controlling the actuation of the FIRST~FOURTH speed clutches 31~34 and the selector servo-mechanism 36, which operates the REVERSE selector 35. Specifically, by engaging the FIRST speed clutch 31, the power is transmitted through the FIRST speed gear train, which comprises the FIRST speed drive gear 21a and the FIRST speed driven gear 21b. In this condition, the transmission is referred to as set at the FIRST speed ratio. In the same manner, by engaging the SECOND speed clutch 32, the transmission is set at the SECOND speed ratio with the power being transmitted through the SECOND gear train comprising the SECOND speed drive gear 22a and the SECOND speed driven gear 22b. Also, by engaging the THIRD speed clutch 33, the transmission is set at the THIRD speed ratio with the power being transmitted through the THIRD gear train comprising the THIRD speed drive gear 23a and the THIRD speed driven gear 23b.

Furthermore, by operating the REVERSE selector 35 to engage the FOURTH speed driven gear 24b to the countershaft 12 as shown in the drawing, and by engaging the FOURTH speed clutch 34, the transmission is set at the FOURTH speed ratio with the power being transmitted through the FOURTH gear train comprising the FOURTH speed drive gear 24a and the FOURTH speed driven gear 24b. Moreover, by operating the REVERSE selector 35 to engage the REVERSE driven gear 25c to the countershaft 12 and by engaging the FOURTH speed clutch 34, the transmission is set at the REVERSE speed ratio with the power being transmitted through the REVERSE gear train comprising the REVERSE drive gear 25a, the REVERSE idle gear 25b and the REVERSE driven gear 25c.

Figure 1:
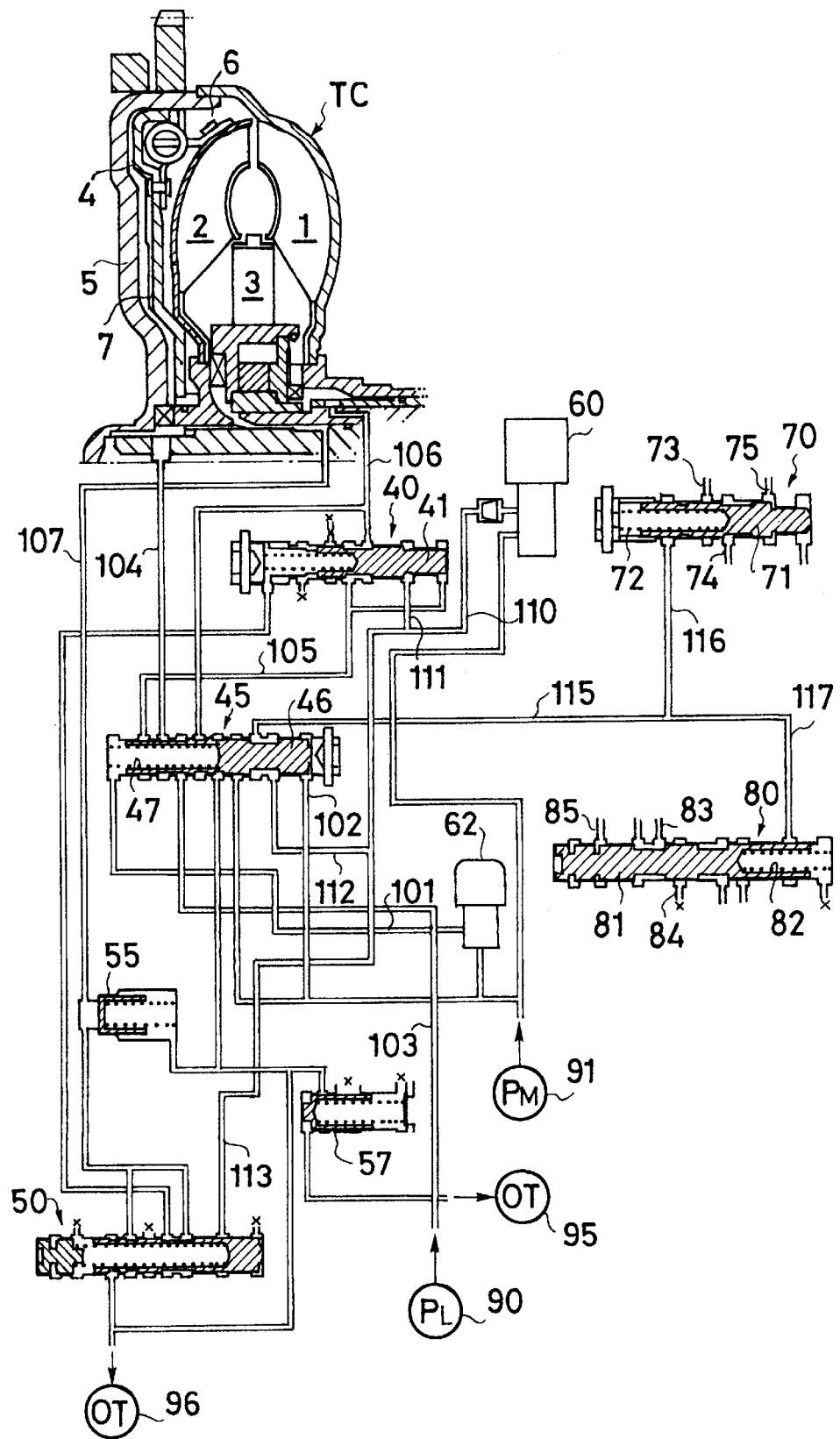
FIG. 1 is a hydraulic circuit diagram showing components which constitute a control system according to the present invention.

FIG. 1 shows a hydraulic circuit used for controlling the actuation of the lock-up clutch 4 of the torque converter TC and for controlling the release of the hydraulic pressure from the off-going clutches during the 2–3 upshift, the 2–4 upshift and the 3–4 upshift, respectively.

This hydraulic circuit includes a lock-up control valve 40, a lock-up shift valve 45 and a lock-up timing valve 50, which are used for controlling the engagement and disengagement of the lock-up clutch 4 of the torque converter TC, and a TC check valve 55, a relief valve 57, etc. and oil passages connecting these valves as shown in the drawing. The hydraulic circuit further includes a line pressure supply source 90, which supplies a line pressure PL, a modulator pressure supply source 91, which supplies a modulator pressure PM, a lubricating unit 95 and an oil cooler 96, all of which are connected as shown in the drawing.

An oil passage 101 connected to the left end of the lock-up shift valve 45 is connected through a lock-up switch solenoid valve 62 to the modulator pressure supply source 91 while an oil passage 102 connected to the right end of the lock-up shift valve 45 is connected directly to the modulator pressure supply source 91. Here, when the lock-up switch solenoid valve 62 is turned off, the modulator pressure PM is supplied to the left end of the lock-up shift valve 45, and, as a result, the modulator pressure PM acts on both the sides, i.e., the right and left sides, of the lock-up shift valve 45. In this condition, the spool 46 of the lock-up shift valve 45 is shifted rightward by the biasing force of a spring 47 as shown in the drawing, so an oil passage 103 connected to the line pressure supply source 90 is connected through the lock-up shift valve 45 to an oil passage 104 which is connected to the lock-up release space 7. As a result, the line pressure PL is supplied into the lock-up release space 7, so the lock-up clutch 4 is released.

On the other hand, when the lock-up switch solenoid valve 62 is turned on, the supply of the hydraulic pressure to the left end of the lock-up shift valve 45 is cut off, so the spool 46 is shifted leftward against the spring 47 by the modulator pressure PM supplied to the right end of the lock-up shift valve 45. As a result, the supply of the line pressure PL from the oil passage 103 is cut off, so the oil passage 104 connected to the lock-up release space 7 is now connected through the lock-up shift valve 45 to an oil passage 105 that is connected to the lock-up control valve 40, which is connected to another oil passage 106 that is connected to the lock-up engagement space 6. Furthermore, another oil passage 107 that is connected to the lock-up engagement space 6 is connected to the lock-up timing valve 50. In this condition, where the lock-up switch solenoid valve 62 is turned on, and the spool 46 of the lock-up shift valve 45 is shifted on the left side, the engagement of the lock-up clutch 4 can be now controlled by controlling the actuation of the lock-up control valve 40 and the lock-up timing valve 50.

For this lock-up clutch engagement control, an oil passage 111 and another oil passage 113 that are branched from an oil passage 110 connected to a linear solenoid valve 60 are connected to the right side of the lock-up control valve 40 and to the right side of the lock-up timing valve 50, respectively. The linear solenoid valve 60 receiving a control current adjusts the modulator pressure PM supplied from the modulator pressure supply source 91. It is the function of the linear solenoid valve 60 to adjust the modulator pressure PM in correspondence to the control current being received and to output a control pressure PC into the oil passage 110.

In this way, the control pressure PC is supplied through the oil passage 111 to the lock-up control valve 40, so the spool 41 of the lock-up control valve 40 is shifted rightward or leftward depending on the magnitude of the control pressure PC. Also, the control pressure PC is supplied through the oil passage 113 to the lock-up timing valve 50, so the spool 51 of the lock-up timing valve 50 is also shifted rightward or leftward depending on the magnitude of the control pressure PC. As a result, the pressure balance between the lock-up engagement space 6 and the lock-up release space 7 is controlled to adjust the engagement of the lock-up clutch 4. In other words, by controlling the current supplied to the linear solenoid valve 60, the control pressure PC output to the oil passage 110 is adjusted correspondingly to engage or disengage the lock-up clutch 4.

An oil passage 112 branching from the oil passage 110, which receives the control pressure PC from the linear solenoid valve 60, is connected to the lock-up shift valve 45. This oil passage 112 is blocked at the lock-up shift valve 45 while the spool 46 of the lock-up shift valve 45 is shifted leftward for the engagement control of the lockup clutch 4 as mentioned above. However, when the spool 46 of the lock-up shift valve 45 is shifted rightward as shown in the drawing for releasing the lock-up clutch 4, the oil passage 112 is connected through the lock-up shift valve 45 to an oil passage 115 that branches into two oil passages 116 and 117 which are connected to a first off-going pressure releasing valve 70 and a second off-going pressure releasing valve 80, respectively.

The first off-going pressure releasing valve 70 controls the release of the hydraulic pressure from the off-going clutches (the THIRD speed clutch and the SECOND speed clutch) when the 3–4 upshift (upshift from the THIRD speed ratio to the FOURTH speed ratio) and the 2–4 upshift (upshift from the SECOND speed ratio to the FOURTH speed ratio) are executed. In the first off-going pressure releasing valve 70, a spool 71 is biased rightward by a spring 72. An oil passage 75 is connected to the first off-going pressure releasing valve 70 in such a way that the pressure supplied from this oil passage 75 acts on the right side of the spool 71. Other oil passages 73 and 74, whose mutual connection is controlled by the shift of the spool 71, are also connected to the first off-going pressure releasing valve 70.

When the 3–4 upshift or the 2–4 upshift is executed, the oil passage 75 is connected through a shift valve, etc., to the on-coming clutch, i.e., the FOURTH speed clutch 34. As a result, the hydraulic pressure actuating the FOURTH speed clutch 34 for engagement acts on the spool 71 and generates a force to push the spool 71 leftward. On the other hand, the control pressure PC being supplied from the linear solenoid valve 60 through the oil passage 116 to the first off-going pressure releasing valve 70 acts on the spool 71 at the small stepped part thereof on the left side and generates a force to push the spool 71 rightward. Therefore, while the 3–4 upshift or the 2–4 upshift is being executed, the rightward and leftward shift of the spool 71 is controlled in correspondence to the balance between the hydraulic pressure actuating the FOURTH speed clutch (on-coming clutch) 34 for engagement and the control pressure PC supplied from the linear solenoid valve 60. When the spool 71 is shifted leftward, the oil passages 73 and 74 are connected to each other through the first off-going pressure releasing valve 70.

Here, the oil passage 73 is connected through a shift valve, etc. to the off-going clutch (the THIRD speed clutch 33 if the 3–4 upshift is executed or the SECOND speed clutch 32 if the 2–4 upshift is executed) while the other oil passage 74 is connected to a drain. Therefore, when the spool 71 is shifted leftward by a changed balance between the hydraulic pressure actuating the FOURTH speed clutch (on-coming clutch) 34 for engagement and the control pressure PC, supplied from the linear solenoid valve 60, these oil passages 73 and 74 are connected to each other, releasing the hydraulic pressure of the off-going clutch. Here, it is clear that the timing for releasing the hydraulic pressure of the off-going clutch for the 3–4 upshift or the 2–4 upshift is controllable by the control pressure PC from the linear solenoid valve 60.

The second off-going pressure releasing valve 80 controls the discharge of the hydraulic pressure from the off-going clutch (in this case, the SECOND speed clutch 32) when the 2–3 upshift (upshift from the SECOND speed ratio to the THIRD speed ratio) is executed. The second off-going pressure releasing valve 80 includes a spool 81, which is biased leftward by a spring 82. An oil passage 85 is connected to the second off-going pressure releasing valve 80 such that the pressure supplied from this oil passage 85 acts on the left side of the spool 81, and other oil passages 83 and 84, whose mutual connection is controlled by the shift of the spool 81, are also connected to the second off-going pressure releasing valve 80.

When the 2–3 upshift is executed, the oil passage 85 is connected through a shift valve, etc., to the on-coming clutch, i.e., the THIRD speed clutch 33. As a result, the hydraulic pressure actuating the THIRD speed clutch 33 for engagement acts on the spool 81 and generates a force to push the spool 81 rightward. On the other hand,. the control pressure PC being supplied from the above mentioned linear solenoid valve 60 through the oil passage 117 to the second off-going pressure releasing valve 80 acts on the spool 81 at the stepped part located right side thereof and generates a force to push the spool 81 leftward. Therefore, while the 2–3 upshift is being executed, the rightward and leftward shift of the spool 81 is controlled in correspondence to the balance between the hydraulic pressure actuating the THIRD speed clutch (on-coming clutch) 33 for engagement and the control pressure PC supplied from the linear solenoid valve 60. When the spool 81 is shifted rightward, the oil passages 83 and 84 are connected to each other through the second off-going pressure releasing valve 80. In this condition, the oil passage 83 is connected through a shift valve, etc. to the off-going clutch (SECOND speed clutch 32) while the other oil passage 84 is connected to a drain.

Therefore, when the spool 81 is shifted rightward by a changed balance between the hydraulic pressure actuating the THIRD speed clutch (on-coming clutch) 33 for engagement and the control pressure PC supplied from the linear solenoid valve 60, these oil passages 83 and 84 are connected to each other, releasing the hydraulic pressure of the off-going clutch to the drain. Here, it is clear that the timing for releasing the hydraulic pressure of the off-going clutch for the 2–3 upshift is controlled by the control pressure PC supplied from the linear solenoid valve 60.

In summary, in the hydraulic circuit shown in FIG. 1, if the lock-up switch solenoid valve 62 is turned off to shift the spool 46 of the lock-up shift valve 45 rightward as shown in FIG. 1, the transmission is set into a lock-up release condition. In this condition, the control pressure PC from the linear solenoid valve 60 is supplied to the first and second off-going pressure releasing valves 70 and 80, so the timing for releasing the hydraulic pressure from the off-going clutch can be controlled for the 3–4 upshift, the 2–4 upshift and the 2–3 upshift. Although the control pressure PC is also supplied through the oil passages 111 and 113 to the lock-up control valve 40 and the lock-up timing valve 50, as long as the spool 46 of the lock-up shift valve 45 is kept rightward, the operation of both the valves 40 and 50 will not affect the lock-up release condition.

On the other hand, if the lock-up switch solenoid valve 62 is turned on to shift the spool 46 of the lock-up shift valve 45 leftward, then the transmission is set into a condition where the engagement of the lock-up clutch 4 is controlled by the lock-up control valve 40 and the lock-up timing valve 50, which receives the control pressure PC from the linear solenoid valve 60. In this condition, the engagement actuation of the lock-up clutch 4 is controllable by means of the control pressure PC while the control pressure PC is not supplied to the first and second off-going pressure releasing valves 70 and 80 because the oil passages 112 and 115 are cut off by the lock-up shift valve 45.

Figure 3:
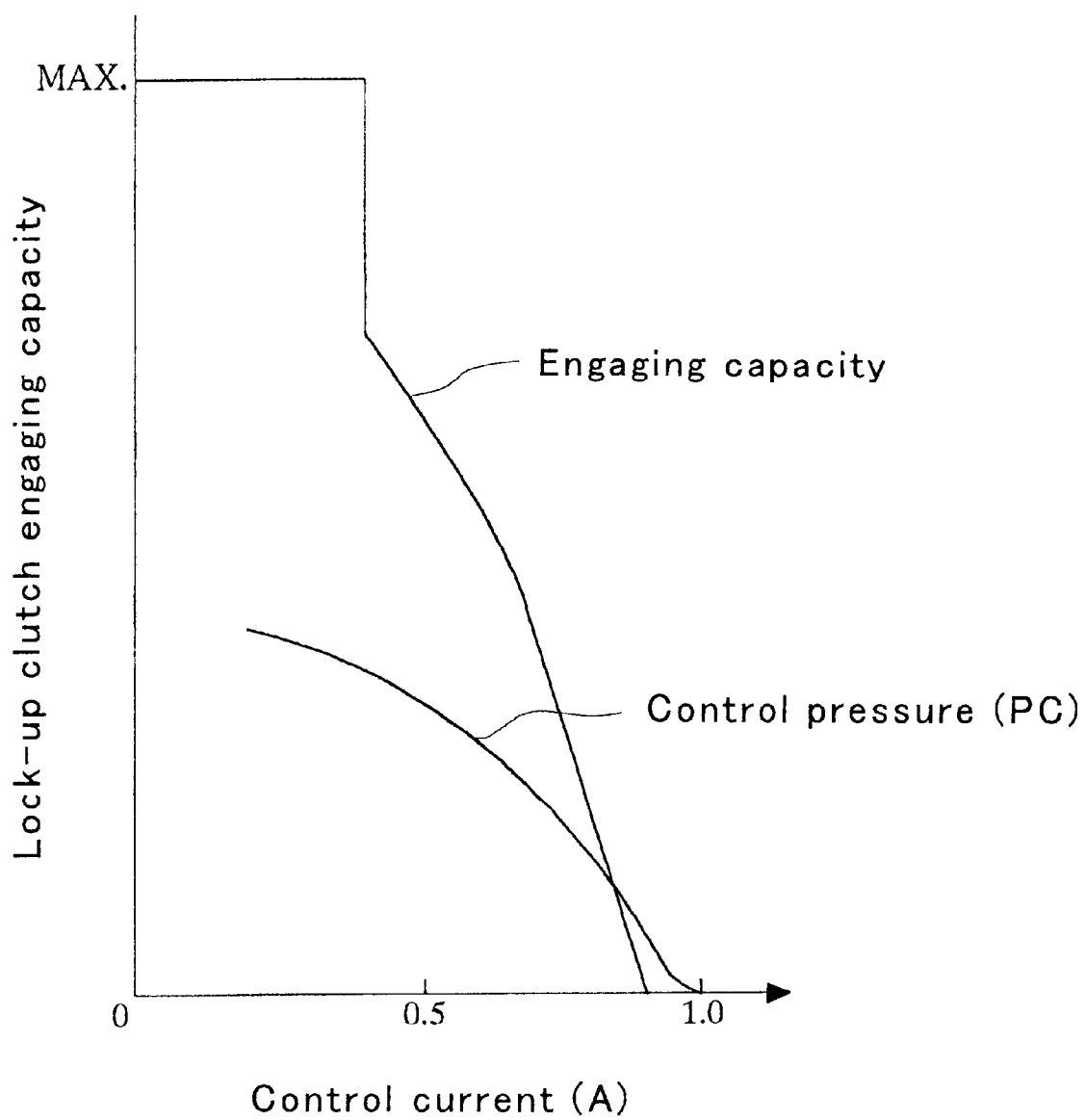
FIG. 3 is a graph showing a relation between the control current used for a linear solenoid valve and the engaging capacity of a lock-up clutch.

To describe this engagement actuation of the lock-up clutch 4 controlled by the linear solenoid valve 60, FIG. 3 shows a relation between the current supplied to the linear solenoid valve 60 and the control pressure PC produced thereby and a relation between the control pressure PC and the engaging capacity of the lock-up clutch adjusted by the control pressure PC. It is understood from this graph that the engaging capacity of the lock-up clutch is adjusted as desired from a minimum (0) to a maximum (MAX) by controlling the current. Such a wide range of adjustment is possible for the engaging capacity because the control pressure PC is supplied to both the lockup control valve 40 and the lock-up timing valve 50 for the operation of the lock-up mechanism. As the engaging capacity of the lock-up clutch is adjustable continuously and smoothly from a small lock-up engagement capacity to a maximum lock-up engagement capacity only by means of the linear solenoid valve 60, improved fuel efficiency and smooth controllability can be achieved for the transmission.

Figure 4:
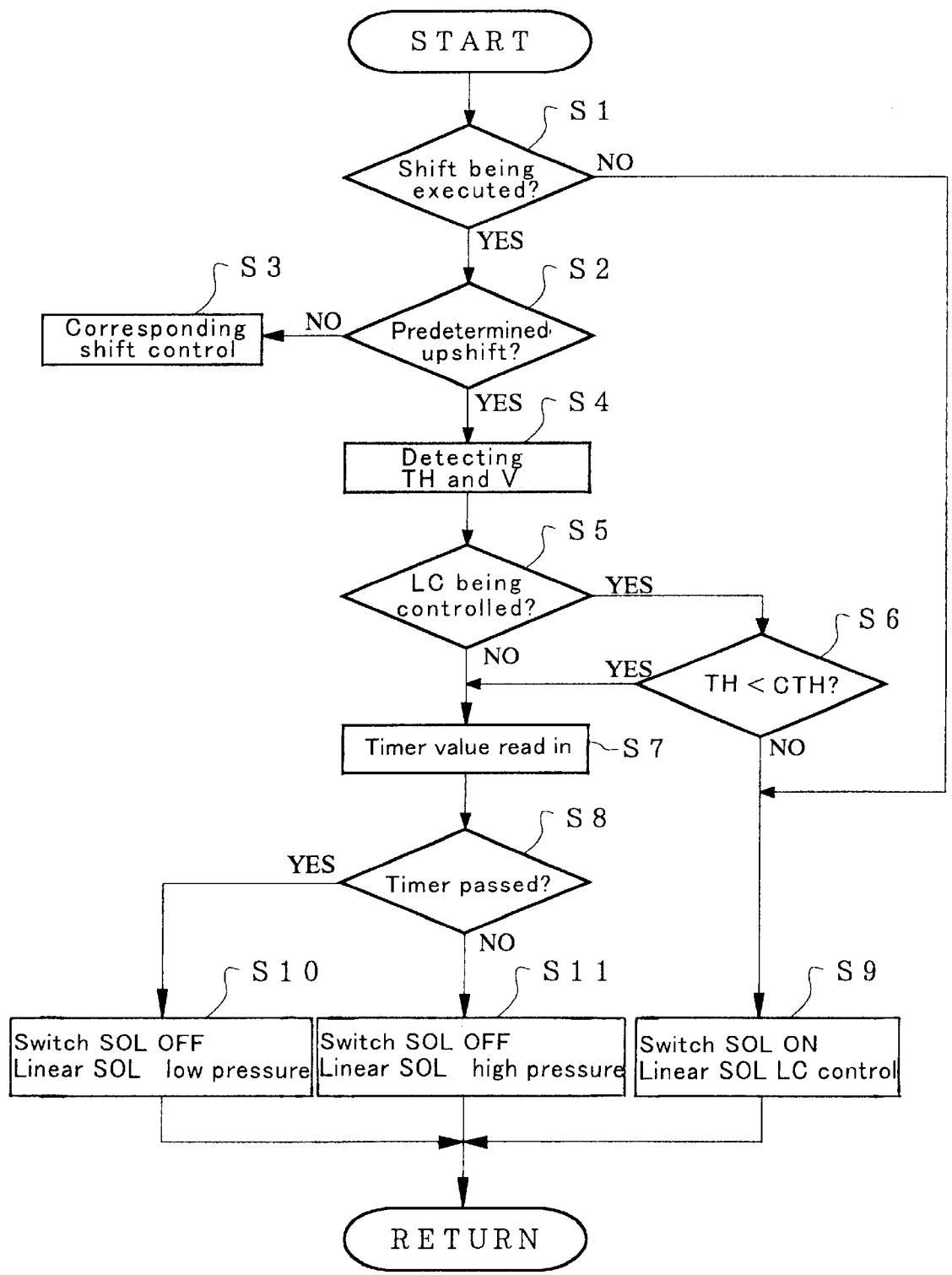
FIG. 4 is a flowchart showing shift control processes executed by the control system.

Now, the release of the off-going clutches for the 3–4 upshift, the 2–4 upshift and the 2–3 upshift controlled by means of the control pressure PC from the linear solenoid valve 60 in this control system is described in reference to FIG. 4. In this control, at first, a determination is made whether or not the transmission is being shifted currently at Step S1. If the transmission is not being shifted, then the control flow proceeds to Step S9, where an ordinary driving control is executed. In the control performed at Step S9, at first, the lock-up switch solenoid valve 62 is turned on to shift the spool 46 of the lock-up shift valve 45 leftward as mentioned above for establishing the condition where the engagement actuation of the lock-up clutch is controllable. In this condition, the operation of the lock-up control valve 40 and the lock-up timing valve 50 is controlled by the control pressure PC from the linear solenoid valve 60 to control the engagement of the lock-up clutch 4.

On the other hand, if the result of the determination executed at Step S1 is that the transmission is being shifted, the control flow proceeds to Step S2, where this currently performed shift is determined whether it is a 3–4 upshift, a 2–4 upshift or a 2–3 upshift. If the shift being performed is not any of these upshifts, then the control flow proceeds to Step S3, where the shift control is performed correspondingly and appropriately to the condition of the transmission. To this case, the shift control of the present invention is not related specifically, so no further description is given. If the shift being performed is determined as one of these upshifts, then the control flow proceeds to Step S4, where the throttle opening TH of the engine and the speed V of the vehicle are detected.

Then, at Step S5, a determination is made whether the engagement control of the lock-up clutch 4 of the torque converter TC is being performed or not. If the engagement control of the lock-up clutch 4 is being performed, then the control flow proceeds to Step S6, where a determination is made whether or not the throttle opening TH is equal to or smaller than a predetermined value CTH, i.e., whether or not the accelerator is being released for the shift. If the throttle opening TH is greater than the predetermined value, then the control flow proceeds to Step S9, where the operation of the lock-up control valve 40 and the lock-up timing valve 50 is controlled by the control pressure PC from the linear solenoid valve 60 to control the engagement of the lock-up clutch 4. Therefore, the shift is executed while the release of the hydraulic pressure from the off-going clutch is controlled only in correspondence to the increase of the hydraulic pressure actuating the on-coming clutch, which pressure is supplied through the oil passage 75 or 85 because the control pressure PC is not supplied to the first off-going pressure releasing valve 70 or the second off-going pressure releasing valve 80 through the oil passage 116 or 117, respectively, in this condition.

Figure 5:
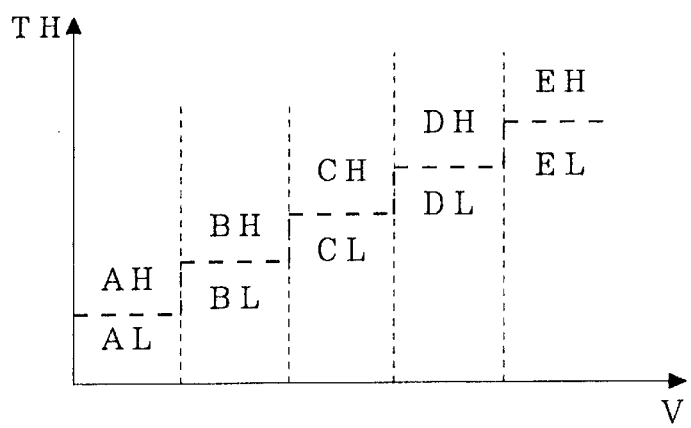
FIG. 5 is a graph showing values for a timer, which is used in the shift control.

On the other hand, if the result of the determination executed at Step S5 is that the engagement control of the lock-up clutch is not being performed, then the control flow proceeds to Step S6. Further, even though the engagement control of the lock-up clutch is being performed, if the throttle opening TH is determined as equal to or smaller than the predetermined value CTH, then the control flow proceeds to Step S7, where a timer value is read in to set the timing for releasing the hydraulic pressure of the off-going clutch. The timer value for each shift type is predetermined in correspondence to the throttle opening TH and the vehicle speed V as shown in FIG. 5. Here, the timer value which corresponds to the throttle opening TH and the vehicle speed V detected at Step S4 is read in from the values shown in FIG. 5. In FIG. 5, the timer values are predetermined greater for the increasing values of the throttle opening TH and the vehicle speed V In other words, the timer values are set as AL<AH, BL<BH, . . . , EL<EH and AL<BL<CL<DL<EL and AH<BH<CH<DH<EH.

According to the timer value read in, the time elapsed from the start of the shift is determined at Step S8. Until the time which corresponds to the timer value elapses, the release of the hydraulic pressure of the off-going clutch is controlled at Step S11, and after the time has elapsed, the release of the hydraulic pressure of the off-going clutch is controlled at Step S10. For the control executed at Steps S10 and S11, the lock-up switch solenoid valve 62 is turned off to shift the spool 46 of the lock-up shift valve 45 rightward, so the control pressure from the linear solenoid valve 60 is supplied to the first and second off-going pressure releasing valves 70 and 80. This condition allows the control of the operation of these valves.

Figure 6:
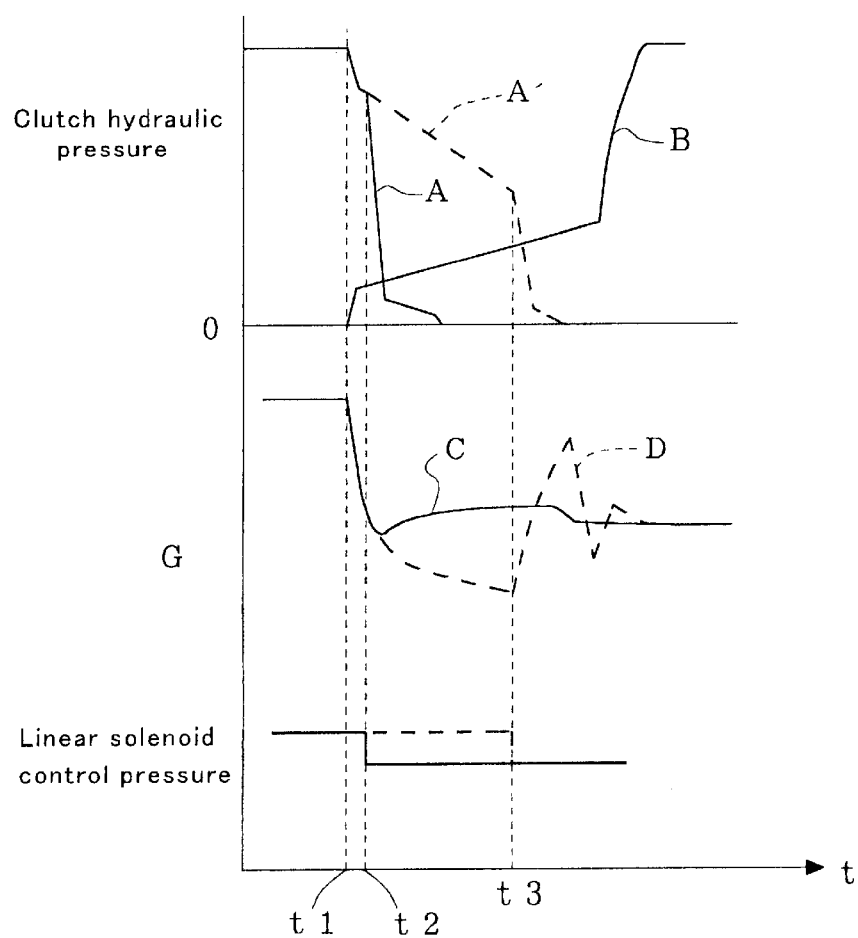
FIG. 6 is a graph showing changes in the hydraulic pressure of the clutch, the acceleration of the vehicle and the control pressure.

FIG. 6 shows graphically this hydraulic pressure release control. The elapsed time determination executed at Step S8 starts at the start of the shift (time t1). Until the time set for the timer elapses, the control pressure PC produced at the linear solenoid valve 60 is controlled to a relatively high pressure. At the moment when the time has elapsed (time t2), the control pressure PC produced at the linear solenoid valve 60 is reduced to a relatively low pressure. Here, because each clutch has an oil passage that includes an orifice before being connected to a drain, as the oil is drained slowly through the passage having an orifice, the hydraulic pressure of the off-going clutch decreases gradually until time t2 as indicated by real line A in FIG. 6 However, because the first and second off-going pressure releasing valves 70 and 8( are released at time t2, the pressure of the off-going clutch decrease rapidly thereafter. In FIG. 6, real line B indicate the hydraulic pressure of the on-coming clutch.

Here, time t2 is the minimum timer value. If the timer value is set to the maximum, then the control pressure PC produced at the linear solenoid valve 60 is changed from the high pressure to the low pressure at time t3. The pressure change of the off-going clutch for this case is indicated by broken line A?in FIG. 6. It is clear from the graph that the pressure decreases gradually until time t3, and thereafter, it decreases rapidly.

As mentioned previously, the smaller the throttle opening, the smaller the timer value is set, and also, the lower the vehicle speed, the smaller the timer value is set. This is to avoid a possibility of shift shock, which may occur if two gear trains are engaged momentarily because of a delay in the release of the hydraulic pressure of the off-going clutch for an upshift which is executed while the accelerator is returned, i.e., for an upshift executed with a small throttle opening. FIG. 6 includes a graph that shows changes in the acceleration G of the vehicle during an upshift while the accelerator is being returned. If the hydraulic pressure of the off-going clutch is released early at time t2 as indicated by real line A, then the acceleration G changes gradually as indicated by real line C. On the other hand, if the pressure of the off-going clutch is released later at time t3 as indicated by broken line A', then the acceleration G increases temporarily as indicated by broken line D. Therefore, the latter case can cause a shift shock.

As described above, the control system according to the present invention comprises release timing adjustment means, which adjusts the timing for releasing the hydraulic pressure of the off-going frictionally engaging element earlier if the throttle opening of the engine is set smaller (i.e., if the condition of the transmission is more to a power-off condition). In this way, the control system sets the timing for releasing the off-going frictionally engaging element appropriate for either a power-on shift or a power-off shift and always achieves a smooth shift operation.

It is preferable that the lower the vehicle speed, the earlier the timing for releasing the pressure of the off-going frictionally engaging element is set by the release timing adjustment means for controlling the valves to be released. The lower the vehicle speed, more likely a shift shock to occur if the timing for releasing the off-going frictionally engaging element is delayed. By controlling the timing appropriately in correspondence to the vehicle speed, a smooth shift operation is achieved for any speed of the vehicle.

Furthermore, for a vehicular automatic transmission which has a torque converter with a lock-up mechanism, it is preferable that the release timing adjustment means comprise a linear solenoid valve, that the operation of a pressure-releasing valve be controlled by means of the control pressure produced by the linear solenoid valve, and that the operation of the lock-up mechanism be controlled also by the control pressure supplied from the linear solenoid valve while a shift is not being executed. In this way, the linear solenoid valve as the release timing adjustment means can also be used for controlling the operation of the lock-up mechanism while the transmission is in ordinary driving condition (i.e., while no shift is being executed). As a result, the control system can be constructed in a relatively simple design.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application Ser. No. 2000-262781 filed on Aug. 31, 2000, which is incorporated herein by reference.

What is claimed is:

1. A control system for an automatic transmission used in a vehicle, said transmission being disposed in a power transmission path between an engine and driving wheels, wherein:

said control system comprises a plurality of frictionally engaging elements, which are actuated for engagement upon receiving a hydraulic pressure to establish selectively a plurality of speed ratios, an upshift from an off-going speed ratio to an on-coming speed ratio being executed by a controlled release of the hydraulic pressure from the frictionally engaging element used for said off-going speed ratio and by a controlled supply of the hydraulic pressure to the frictionally engaging element used for said on-coming speed ratio;

said control system further comprises an off-going pressure releasing valve, which releases the hydraulic pressure of the frictionally engaging element used for said off-going speed ratio, and release timing adjustment means, which controls operation of said off-going pressure releasing valve; and said release timing adjustment means controls the operation of said off-going pressure releasing valve in correspondence to a throttle opening of said engine, by adjusting a timing for releasing the hydraulic pressure from the frictionally engaging element used for said off-going speed ratio earlier for a smaller throttle opening of said engine.

2. The control system as set forth in claim 1, wherein:

the frictionally engaging element used for said off-going speed ratio is equipped with an oil discharge passage that has an orifice before opening to a drain;

said release of the hydraulic pressure from the frictionally engaging element used for said off-going speed ratio during said upshift from said off-going speed ratio to said on-coming speed ratio is controlled such that, at first, oil is discharged gradually through said oil discharge passage because of said orifice choking a flow of oil, and upon opening said off-going pressure releasing valve, the oil is discharged rapidly; and said timing for releasing the hydraulic pressure is a timing that opens said off-going pressure releasing valve for the release of the hydraulic pressure.

3. The control system as set forth in claim 1, wherein:

said release-timing adjustment means controls the operation of said off-going pressure releasing valve in correspondence to a speed of said vehicle, by adjusting the timing for releasing the hydraulic pressure from the frictionally engaging element used for said off-going speed ratio earlier for a lower speed of said vehicle.

4. The control system as set forth in claim 1, wherein:

the operation of said off-going pressure releasing valve is controlled in correspondence to a control pressure supplied from said release timing adjustment means and to the hydraulic pressure that actuates the frictionally engaging element used for said on-coming speed ratio.

5. The control system as set forth in claim 1, wherein:

said release timing adjustment means comprises a linear solenoid valve; and the operation of said off-going pressure releasing valve is controlled by means of a control pressure generated from said linear solenoid valve.

6. The control system as set forth in claim 1, wherein:

said automatic transmission, which is used in said vehicle, comprises a torque converter with a lock-up mechanism, said torque converter being connected to an output shaft of said engine; and a control pressure supplied from said release timing adjustment means is used for controlling operation of said lock-up mechanism while no shift is being performed.

7. The control system as set forth in claim 6, further comprising a lock-up shift valve, which supplies said control pressure from said release timing adjustment means selectively to said off-going pressure releasing valve or to a lock-up control valve that controls the operation of said lock-up mechanism.

8. The control system as set forth in claim 6, wherein:

the operation of said off-going pressure releasing valve is controlled in correspondence to said control pressure from said release timing adjustment means and to the hydraulic pressure that actuates the frictionally engaging element used for said on-coming speed ratio;

while said control pressure from said release timing adjustment means is being used for controlling the operation of said lock-up mechanism, if the throttle opening of said engine is equal to or greater than a predetermined value, then the operation of said off-going pressure releasing valve is controlled for a shift in correspondence only to the hydraulic pressure that actuates the frictionally engaging element used for said on-coming speed ratio.

* * * * *